United States Patent [19]

Welbourn et al.

[11] Patent Number: 4,461,568
[45] Date of Patent: Jul. 24, 1984

[54] ASSESSING THE COLOR OF GEMSTONES AND THE LIKE

[76] Inventors: Christopher M. Welbourn, "Oswald", London Rd., Sunningdale, Berkshire; Robert W. Ditchburn, 9, Summerfield Rise, Goring-on-Thames, Reading, Berkshire; Andrew D. G. Stewart, The Old Rectory, Ashampstead, Reading, Berkshire, all of England

[21] Appl. No.: 272,287
[22] Filed: Jun. 10, 1981
[51] Int. Cl.³ .............................................. G01J 3/50
[52] U.S. Cl. ..................................... 356/30; 250/228; 356/408; 356/236
[58] Field of Search ................. 356/30, 408, 236, 244, 356/418; 250/228

[56] References Cited
U.S. PATENT DOCUMENTS 2,960,909 11/1960 Shipley, Jr. ............................ 356/30
3,463,596 8/1969 Selgin .............................. 356/408 X
3,751,162 8/1973 Long ..................................... 356/30
3,838,926 10/1974 Kato et al. .......................... 356/236
4,259,011 3/1981 Crumm et al. ........................ 356/30

FOREIGN PATENT DOCUMENTS 2036360 6/1980 United Kingdom ................. 356/30

OTHER PUBLICATIONS

Galuza et al., *Instrum. & Exp. Tech.* (USA), vol. 19, No 4, Jul.–Aug. 1976, Published Feb. 1977, pp. 1157 and 1158.

Primary Examiner—F. L. Evans
Attorney, Agent, or Firm—Shapiro and Shapiro

[57] ABSTRACT

The color of gemstones or the like is assessed by projecting light onto the stone, using an interrupting member to regularly interrupt the path of the light shortly before it reaches the stone, the member having a normally white, diffusing interrupting surface, and using a detector for detecting the color of the light coming from the gemstone and from the interrupting surface of the interrupting member. Preferably, the stone is mounted in a chamber having normally white, diffusing internal walls and the diffusing interrupting surface is within the chamber.

15 Claims, 5 Drawing Figures

ASSESSING THE COLOR OF GEMSTONES AND THE LIKE

BACKGROUND OF THE INVENTION

The present invention relates to apparatus and a method for assessing the colour of gemstones and the like. The apparatus and method were developed primarily for diamonds, but may be used for other suitable stones such as other gemstones or simulants and for diamond simulants, and also for pearls—where the context admits, the terms "gemstones or the like" or "stone or the like" as used herein includes simulants and pearls.

Very small colour differences can have a large effect on the value of a gemstone, and it is important to be able to sort gemstones accurately according to their colour. The most usual method at present is for the stones to be examined visually by an expert using a lens of 10× magnification. This method is slow, requires considerable expertise and has relatively poor reproducibility.

Various apparatuses have been proposed, the apparatuses in general having a chamber for containing the gemstone, mounting means for mounting the gemstone, projecting means for projecting light onto the stone and detecting means for detecting the colour of the light reflected from the stone. The purpose of the apparatuses is to give objective measurements of the colour of the stone.

THE INVENTION

In accordance with a preferred form of the apparatus of the invention, an interrupting surface within a chamber having diffusely reflecting internal walls is in effect directly substituted for a stone when a light path is interrupted, avoiding changing the conditions within the chamber as much as possible and enabling very direct colour comparisons to be obtained with the minimum of extraneous factors. In a simple and relatively cheap manner, good reproducibility can be obtained which is not critically affected by changes in the light source, and the apparatus can be arranged such that no re-calibration or re-standardisation is required before each measurement. Furthermore, only a short measurement time need be required. Automatic assessment is possible, and the automatic assessment can be associated with automatic feed of successive stones and automatic recording of the successive assessments.

The diffusing (diffusely reflecting) internal walls cause repeated diffuse reflections to occur before a representative fraction of the mixed and randomised light is detected. In this way, the precise orientation of the stone about its axis is relevant only in so far as it affects the amount of light which is reflected back through the inlet, i.e. the hole by which it enters. However accurate placing and orientation of the stone is needed for optimum functioning of the apparatus.

The apparatus of the invention can be used to assess the colour of some suitably shaped rough stones. It is furthermore believed that the colour of pearls can be assessed although specific filters would have to be used.

The apparatus can have one or more outlets for allowing the diffused light to leave the chamber without any back reflection or refraction which might alter the colour assessment.

Particularly, when assessing the colour of diamonds, the internal walls should be as white as is convenient in practice. Suitable white matt or "perfectly diffusing" paints giving surfaces of high diffuse reflection coefficient are available. However, some colour absorption on the internal walls is tolerable, even thought it may not be desirable. As much of the internal walls should be white and diffusing as is conveniently possible, but there will be places where it is not possible to have white, diffusing surfaces, for instance at the inlet for the light, the outlet(s) for detecting means, small parts of the mounting means and joins between surfaces. In general terms, however, as long as 90% of the internal surfaces are white and diffusing, the apparatus can perform satisfactorily.

Preferably, the projected light is white of high colour-temperature, although in some circumstances e.g. slightly blue light can be beneficial.

When assessing the colour of sapphires it may be better to use a green surface which had previously been standardised.

The light path can be regularly interrupted in any suitable way, the normal way being using a rotary interrupting member having the white, diffusing interrupting surface.

In the case of brilliant cut diamonds or similarly cut gemstones in general, the stone is preferably mounted so that the projected light is incident on the flat table in a direction approximately perpendicular to the surface of the stone, the pointed culet being at the back. It is believed that even if there is a weakly diffusing translucent screen in the light path, immediately in front of this zone, some size limitation is imposed by the width of the beam, and it is preferred that the beam should narrow, not being wider than the table itself. It is preferred that the light be a converging beam, focused on the stone, preferably on the surface upon which the light is incident or, if there is a weakly diffusing translucent screen in the light path immediately in front of the stone, focused on the screen. It is not certain that one could project the light on to other surfaces of brilliant cut diamonds, although this possibility is not excluded. If the weakly diffusing translucent screen is used, the light is incident on the stone over a wide range of angles and reproduces the effect of what happens when the stone is mounted in jewellery and is seen in normal diffused light.

The invention can also be used with stones which are not brilliant cut, provided they are suitably positioned.

Any suitable form of detecting means can be used; for instance incorporating a series of filters or a spectrophotometer. For instance, it is possible to perform a full spectographic analysis and convert the detected colours to the C.I.E. (International Commission on Illumination) colour coordinate system. However, such precision is not of direct interest to the gem trade, and simpler and less expensive arrangements are possible and can provide a statement on colour according to desired criteria which are suitable for the particular gemstones being assessed. The assessment can be matched to the sensitivity of the eye or to known sensitivity curves, and allowance can be made for any effects due to the size of the stone.

In the particular case of cape series diamonds, the yellowness of the stone is important, and there may be an initial, relatively unskilled, manual sort to remove for instance brownish or purple stones. Commercially the yellowness of cape diamonds is assessed on one of a number of scales. The apparatus can be calibrated to perform a grading, according to any one of these scales on the basis of stones already graded by skilled craftsmen. To assess the yellowness, the difference or ratio between the readings for red light and blue can be measured and then used as fixed points on a numerical scale of yellowness. Scales for brown, purple or greenish tinged diamonds can be provided, for instance related to the red/green ratio in the case of brown and greenish diamonds. If the stones are not all of the same weight (within a range of about 20%) it is necessary to take the weight into account when relating the reading to the colour. This can easily be done by tables or a nomogram, or by a small programmed computer. This allowance is believed to be important only for stones of weight less than 0.8 carat or 0.16 gms.

A scale of greyness can be established by detecting the light without using a filter so as to compare the total light received from said interrupting surface with that received from the stone. If no filter is used, the light is assessed in terms of the sensitivity curve of the particular detector used, but a suitable filter can be used to approximate to the sensitivity curve of the human eye.

If it is desired, the colour assessment can include fluorescent light, i.e. light which is emitted from the stone at a wavelength different from that of the incident light. In order to do this, filters can be placed in the light path before the light enters the chamber to make the spectral composition of the light approximate to that under which gemstones are normally seen, generally considered to be normal indoor lighting.

If however it is desired to exclude fluorescence, filters can be placed to remove extreme blue and near ultra-violet from the light before it reaches the stone, a suitable filter being Chance's OY 10.

Although filters of only two different colours can be suitable for cape series diamonds, the preferred arrangement has filters of three different colours, namely red, green and blue. It is also preferred to provide the filter member with an opaque area (for sensing the null point) and a transparent area, for measuring greyness in the manner mentioned above.

The preferred chamber is spherical, but it is not essential that the chamber should be truly spherical or even near-spherical. Any enclosed chamber, or composite chamber, such as a cylindrical chamber can be used. However, although a spherical chamber is normally more costly, it avoids problems caused by sharp corners and excessive light absorption due to multiple reflection.

It is desirable that the interrupting surface should be as close as possible to the stone. If, for special reasons, the stone is in a compartment adjacent to a window thereof, the interrupting surface is preferably as close as possible to the window.

DESCRIPTION OF PREFERRED EMBODIMENTS

The invention will be further described, by way of example, with reference to the accompanying drawings, in which.

Figure 1:
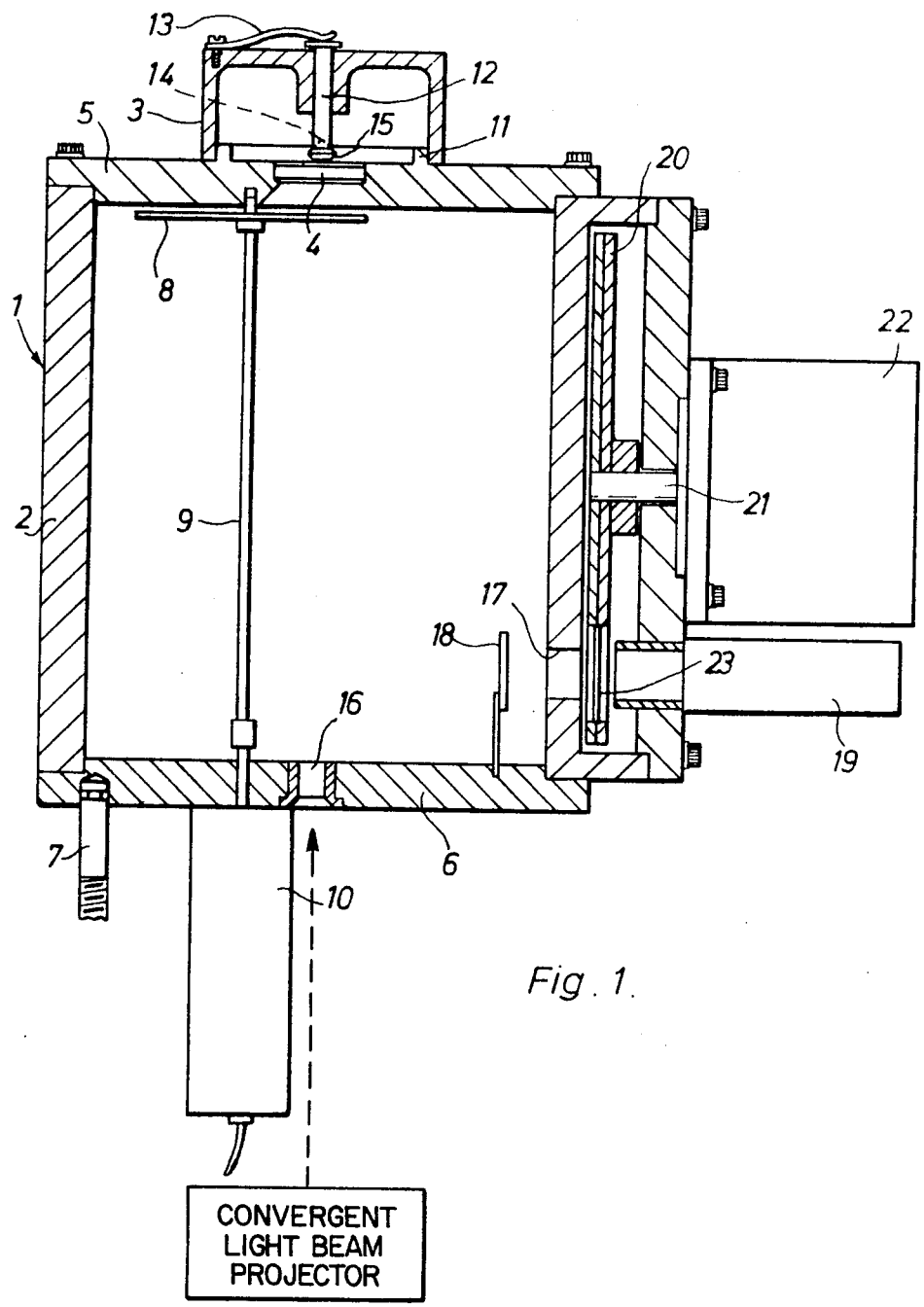
FIG. 1 is a section (along the line I—I in FIG. 2) through an apparatus in accordance with the invention.
Figure 2:
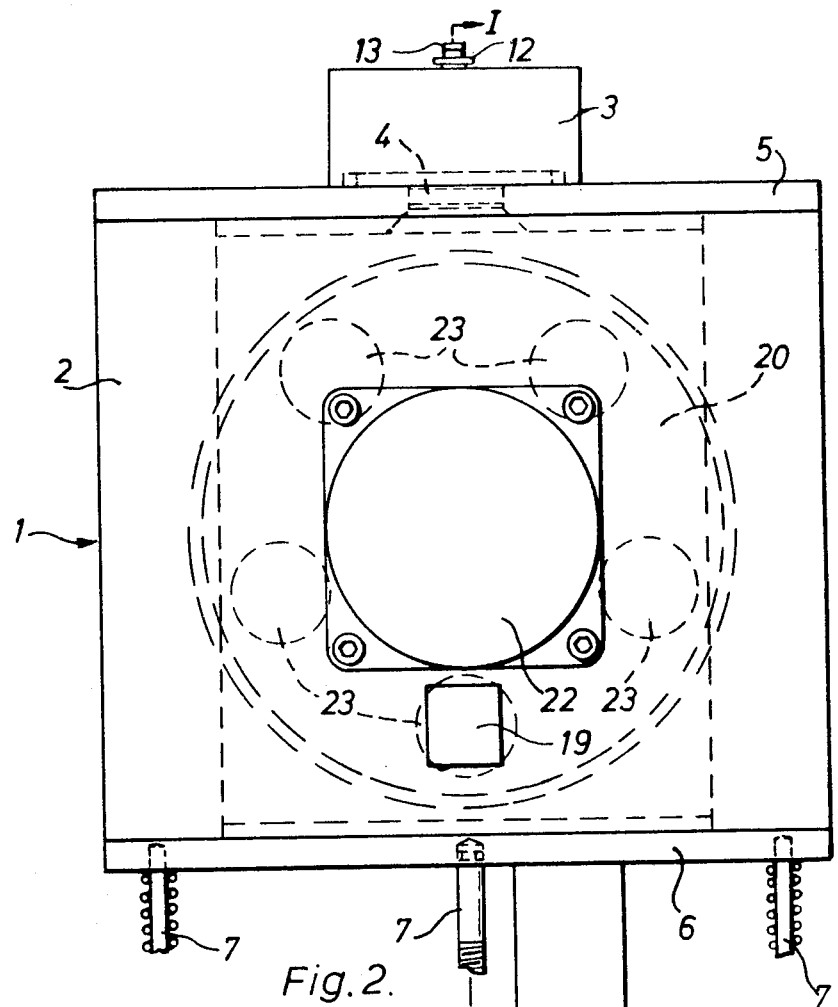
FIG. 2 is an end view of the apparatus of FIG. 1.

The apparatus of FIGS. 1 and 2 has a chamber which in effect is composed of two compartments 2, 3 separated by a transparent, colourless glass window 4. The main compartment 2 is of cylindrical shape and has removable end plates 5, 6. The bottom end plate 6 is supported by adjustable levelling screws 7. Within the main compartment 2 there is a rotary interrupting member 8 mounted on a shaft 9 driven by an electric motor 10.

The interrupting member 8 can be of "paddle" form, having, for instance, three equi-spaced sector-shaped vanes with the spaces between the vanes equal in size to the vanes themselves.

The subsidiary compartment 3 is removable and merely rests on top of the top end plate 5, being located by an annular lip 11, the subsidiary compartment 3 also being of cylindrical shape. The subsidiary compartment 3 contains stone mounting means in the form of a pin 12 which can be slid upward for removal, and is held in position and lightly biased downwards by a leaf spring 13 which can be swung out of the way. The pin 12 has a conical recess 14 in its bottom end for receiving the culet of a diamond 15, the arrangement being such that the table of the diamond rests on the window 4 and is lightly pressed against it by the pin 12. In this way the diamond is accurately positioned and orientated. The interrupting member 8 is as close as is convenient below the window 4, and thus is relatively close to the diamond 15.

The main compartment 2 has an inlet 16 for projecting light on to the diamond 15, and the inlet 16 can be formed by, for instance, a white plastics material bush which is sized to act as a collimator. Any suitable optical system can be used to project a beam through the inlet 16 on to the table of the diamond 15, the beam preferably not being wider than the table of the diamond 15. The beam is a converging beam, focused on the top surface of the window 4 i.e. in effect on the table of the diamond 15. If desired, the window 4 can be formed as a weakly diffusing translucent screen by lightly grinding its top or bottom surface.

Detecting means are provided, including an outlet 17 for allowing diffused light to leave the chamber 1. A diaphragm 18 is placed so that no light coming directly from the diamond 15 can pass out of the outlet 17 without first striking an internal wall of the chamber 1. The light issuing through the outlet 17 is sensed by any suitable detector which is indicated schematically at 19. Immediately adjacent the outlet 17 there is a rotary filter member 20 carried on a shaft 21 driven by an electric motor 22. The filter member 20 is shown dashed in FIG. 2, and has filters 23 of three different colours and an opaque disc and a transparent disc. Suitable filters are Chance's OR 1 (red), Chance's OGr1 (green) and Chance's OB10 (blue), chosen because of the relation of their transmissions to the red, green and blue discrimination of the human eye.

In the preferred arrangement, the motor 10 is a DC torque motor and the motor 22 is a stepper motor phase locked to the motor 10. During the period in which any one of the filters 23 is in front of the outlet 17, there should be at least one complete rotation of the interrupting member 8, and preferably from two to twenty rotations. A suitable speed for the interrupting member 8 is 600 r.p.m. The same relationship between the speeds of the interrupting member 8 and of the filter member 20 can be obtained using a slave motor. In this way, while any one filter 23 is in front of the outlet 17, at least one electric pulse, derived from the diamond 15 and at least one electric pulse, derived from the light from the interrupting member 8, is produced. These pulses are electronically processed in a processor (not shown) so that the ratio of light received from the diamond 15 to light received from the interrupting member 8 is calculated for the different filters 23. In this way, the light which was incident on the diamond 15 and passes through one filter 23 is compared with that which passes through another filter 23. If the detector 19 is sensitive to infrared radiation, the infra-red radiation is removed by means of a heat filter which can be placed on the input side. The transparent disc 23 enables the ratio of the total light from the diamond 15 to that from the interrupting member 8 to be calculated, for evaluating the brightness of the diamond 15.

The whole of the interior of the chamber 1 is painted with a white paint having a high diffuse reflection coefficient, including the pin 12, both sides of the interrupting member 8 and its shaft 9, the diaphragm 18 and its support and the walls of the outlet 17.

Using this apparatus, it is possible to arrange for an automatic feed of the subsidiary compartment 3 and automatic recording of the colour data.

Figure 3:
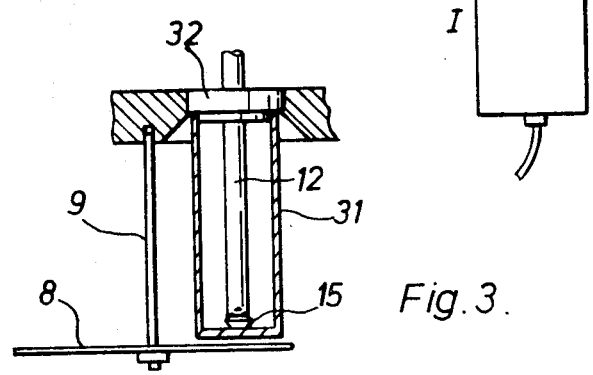
FIG. 3 is a scrap view, in section as in FIG. 1, indicating a modification of the apparatus of FIG. 1.

The apparatus of FIG. 3 is very similar to that of FIGS. 1 and 2, except that the mounting means for the diamond comprises a removable container 31 which is made of glass or transparent plastic and has an opaque cover cap 32 whose bottom surface is white-painted and through which the pin 12 passes. This container 31 is placed in the hole that received the glass 4 in the apparatus of FIGS. 1 and 2. If desired, the bottom of the container 31 can be made to act as a weakly diffusing, translucent screen by lightly grinding of the outer surface. As above, the beam of light is preferably not wider than the table of the diamond 15 and is converging, focused on the ground outer surface of the container 31.

The glass of the container 31, and the glass of the window 4, can have a light absorption of 2% or less, with no substantial colour absorption. The effect of the glass is allowed for when calibrating the apparatus.

Figures 4, 5:
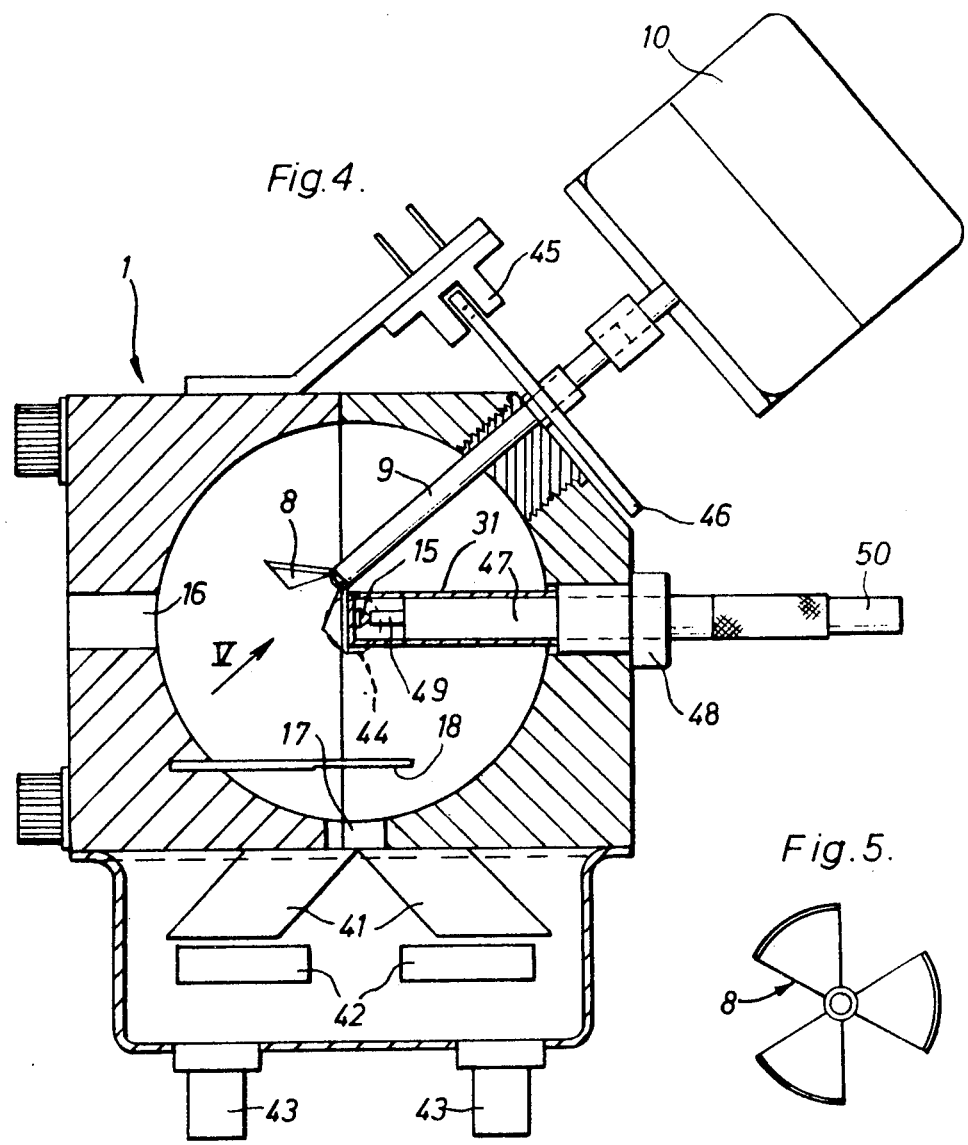
FIG. 4 is a section through another apparatus in accordance with the invention.
FIG. 5 is a scrap view, looking along the arrow V in FIG. 4.

The apparatus of FIGS. 4 and 5 is similar in principle to that of FIGS. 1 and 2, and the same references are used for parts which perform the same functions. In this apparatus however, the internal wall of the chamber 1 has the preferred spherical shape. In addition, instead of the moving filter member 20, the light issuing through the outlet 17 is directed by two reflecting prisms 41 through two separate filters 42 and thence to two separate detectors, shown schematically at 43. If desired, a further outlet 44 can be provided for another filter and another detector, and the filters 42 could be associated with separate outlets rather than with the same outlet 17.

The detectors 43 can be nominally identical, and any small differences which occur in practice can be allowed for when calibrating the apparatus. The rotation of the interrupting member 8 is sensed by a counter (for instance an infra-red counter) 45 actuated by a pulse wheel 46 mounted on the shaft 9, and the pulses so produced are used to activate a phase-sensitive detector.

The container 31 is a push-fit on the end of a diamond mount 47 which is carried on a push-fit bush 48. The mount 47 is hollow and contains a spring-loaded tube 49 connected to an end piece 50; the end of the tube 49 engages the culet of the diamond 15, pressing the table of the diamond 15 lightly against the end of the container 31. The diamond is positioned so that the centre of its table is at or adjacent the centre of the spherical internal wall of the chamber 1. The interrupting surface on the interrupting member 8 is immediately adjacent the position of the diamond 15 when it interrupts the light path; if desired a weakly diffusing, translucent screen can be formed in the light path, immediately in front of the diamond 15, by, as above, lightly grinding the outer surface of the container 31. As above, the beam is preferably not wider than the table of the diamond 15 and is converging, focused on the ground outer surface of the container 31.

It is thought that an acceptable assessment of the colour of the stones or the like may be possible without the need for the chamber 1 particularly if diffusing panels or the like are arranged close to the apparatus.

We claim:

1. Apparatus for assessing the colour of gemstones and the like, comprising:
   a chamber having diffusely reflecting internal walls of a colour appropriate to the colour of said gemstones;
   means for mounting a gemstone in the chamber;
   means for projecting a converging beam of light onto the stone;
   an interrupting member for regularly interrupting the path of the light beam shortly before it reaches the stone, the member having an interrupting surface which is within the chamber when it interrupts the light path, the interrupting surface being immediately adjacent the position of the gemstone when the interrupting surface interrupts the light path;
   drive means connected to the interrupting member for driving the interrupting member to regularly interrupt the light path;
   substantially the entire structure of the interrupting member, and its connection to the drive means, that is within said chamber having diffusely reflecting surfaces of said appropriate colour; and
   means for detecting the colour of the light diffusely reflected from the internal wall of the chamber when the light path is interrupted and when the light path is not interrupted, the detecting means being arranged so that substantially all light detected has suffered at least one diffuse reflection.

2. The apparatus of claim 1, wherein said appropriate colour is white.

3. The apparatus of claim 1 or claim 2, wherein the chamber is spherical and the mounting means is for mounting the gemstone approximately at the centre of the sphere.

4. The apparatus of claim 1, wherein the detecting means comprises a moving filter member having filters of at least two different colours, which regularly interrupt the path of light to a light detector sensitive at least to the light passing through the filters, and means for comparing the light which is incident on the gemstone and passes through one filter with that which passes through the other filter and for comparing the light which was incident on the stone with that which was incident on the interrupting surface.

5. The apparatus of claim 4, wherein the moving filter member has filter areas of at least two different colours, an opaque area and a transparent area.

6. The apparatus of claim 4, wherein the moving filter member has filters of three different colours.

7. The apparatus of claim 1, wherein there is a weakly diffusing, translucent screen in the light path immediately in front of the position of the gemstone.

8. The apparatus of claim 7, wherein the light projecting means is for projecting a converging beam of light which is focused on the translucent screen.

9. The apparatus of claim 1, wherein the light projecting means is for projecting a converging beam of light which is focused on the gemstone.

10. The apparatus of claim 1, wherein the mounting means includes a substantially transparent support in the light path immediately in front of the portion of the gemstone and means for causing the gemstone to rest against the support.

11. The apparatus of claim 10, wherein said causing means is a member which engages the opposite side of the gemstone, the member having a recess for receiving and centering the gemstone.

12. The apparatus of claim 10, wherein said causing means is a spring-loaded member which engages the opposite side of the gemstone.

13. The apparatus of claim 1, wherein the light projecting means is for projecting a narrow beam of light onto the gemstones.

14. Apparatus for assessing the colour of gemstones and the like, comprising:
   a chamber having diffusing internal walls of a colour appropriate to the colour of said gemstones;
   means for mounting a gemstone in the chamber, one internal wall of said chamber having a hole for receiving said mounting means, said mounting means comprising a movable container for containing the gemstone, the container having transparent, colourless walls within the chamber and having a diffusing internal wall which fills said hole and forms part of said one internal wall of the chamber and is of said appropriate colour;
   means for projecting light onto the stone;
   an interrupting member for regularly interrupting the path of the light shortly before it reaches the stone, the member having a diffusing interrupting surface which is within the chamber when it interrupts the light path and which is of said appropriate colour; and
   means for detecting the colour of the light diffusely reflected from the internal wall of the chamber when the light path is interrupted and when the light path is not interrupted, the detecting means being arranged so that substantially all light detected has suffered at least one diffuse reflection.

15. Apparatus for assessing the colour of gemstones and the like, comprising:
   a chamber having diffusing internal walls of a colour appropriate to the colour of said gemstones;
   means for mounting a gemstone in the chamber;
   means for projecting light onto the stone;
   an interrupting member for regularly interrupting the path of the light shortly before it reaches the stone, the member having a diffusing interrupting surface which is within the chamber when it interrupts the light path and which is of said appropriate colour;
   drive means for driving the interrupting member to regularly interrupt the light path;
   means for detecting the colour of the light diffusely reflected from the internal wall of the chamber when the light path is interrupted and when the light path is not interrupted, the detecting means being arranged so that substantially all light detected has suffered at least one diffuse reflection; and
   said chamber having two compartments, one compartment containing the interrupting member and having inlets for the light and for the detecting means and the other compartment being removable and containing the mounting means.

* * * * *